(12) United States Patent
Gupta (10) Patent No.: US 12,393,918 B2
(45) Date of Patent: Aug. 19, 2025

(54) AUTOMATED TELLER MACHINE ("ATM") COLOR TECHNOLOGY FOR MASS TRANSACTION PRE-STAGING

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 155 days.

(21) Appl. No.: 18/519,148

(22) Filed: Nov. 27, 2023

(65) Prior Publication Data
US 2025/0173692 A1    May 29, 2025

(51) Int. Cl.
*G06Q 20/10*    (2012.01)
(52) U.S. Cl.
CPC .................. *G06Q 20/1085* (2013.01)
(58) Field of Classification Search
CPC ........ G06K 19/07703; G06K 19/07705; G06K 19/07707; G06Q 20/1085; G07F 19/00; G07F 19/20
USPC .................... 235/379, 492; 705/43
See application file for complete search history.

(56) References Cited

U.S. PATENT DOCUMENTS

| | | | |
|---|---|---|---|
| 9,864,944 B2 | 1/2018 | Radu et al. | |
| 2004/0124246 A1 | 7/2004 | Allen et al. | |
| 2017/0289127 A1* | 10/2017 | Hendrick | H04W 12/065 |
| 2019/0286805 A1 | 9/2019 | Law et al. | |
| 2021/0209438 A1* | 7/2021 | Sherif | G07F 7/0846 |
| 2021/0304164 A1* | 9/2021 | Gupta | G06K 19/07709 |
| 2021/0365927 A1* | 11/2021 | Gupta | G06K 7/0065 |
| 2024/0403851 A1* | 12/2024 | Behera | G07F 7/084 |

OTHER PUBLICATIONS

Usman et al., "SIT: A Lightweight Encryption Algorithm for Secure Internet of Things," International Journal of Advanced Computer Science and Applications, Mar. 22, 2018.
"Are Contactless Cards Safe?" www.thalesgroup.com, Gemalto, Retrieved on Mar. 23, 2020.

* cited by examiner

*Primary Examiner* — Suezu Ellis
(74) *Attorney, Agent, or Firm* — Weiss & Arons LLP (57) ABSTRACT

Wait times at ATMs may undermine the utility of these self-service machines. ATMs are configured to provide faster self-service kiosks that allow users to quickly perform common financial transactions. However, it has been increasingly common for users to have to wait in a queue to access an ATM. Systems and methods are provided for an ATM that pre-stages transactions by extracting account balance, account status, account fraud, and other necessary information from a plurality of smart cards, before a user begins interacting with the ATM. Information extracted from the plurality of smart cards may be transferred to the ATM wirelessly. Color changes may then be sent from the ATM to the plurality of smart cards. The color changes indicate whether the plurality of smart cards may transact with the ATM without any additional information, thereby improving the transaction processing efficiency of the plurality of smart cards and enhancing user satisfaction.

20 Claims, 5 Drawing Sheets

AUTOMATED TELLER MACHINE ("ATM") COLOR TECHNOLOGY FOR MASS TRANSACTION PRE-STAGING

FIELD OF TECHNOLOGY

Aspects of the disclosure relate to color technology for mass pre-staging of automated teller machine ("ATM") transactions.

BACKGROUND OF THE DISCLOSURE

Wait times at ATMs may detract from the utility of these self-service machines. ATMs are deployed to provide self-service kiosks that allow users to quickly perform common financial transactions. However, it has been increasingly common for users to have to wait in a queue to access an ATM while other users complete their transactions at the ATM.

An ATM may be capable of processing a higher number of financial transactions per unit of time than a human teller. However, an ATM transaction typically requires numerous inputs from a user before a transaction may be initiated and completed. For example, the ATM may first require a user to insert a card, such as a debit card, into the ATM.

The card may be a smart card. The terms "card" and "smart card" may be used interchangeably. The smart card may include an account or other information that links the user to one or more financial accounts. Information stored on the card may include an identifier and username.

Other users may need to wait in a queue while a prior user responds to the prompts and completes their desired transaction. The lengthy wait time may increase user dissatisfaction and reduce the transaction efficiency of an ATM.

Some technology solutions exist for reducing the number of ATM prompts and user responses. However, these solutions typically require additional third-party hardware and services, such as a mobile device or laptop/desktop. These solutions, in addition to increasing costs associated with obtaining the third-party hardware and services, increase security risks. For example, a third-party device must be adequately secured to transmit and receive sensitive financial data. Communication channels between the third-party device and the ATM must also be secured. Any financial data stored locally on the third-party device must be adequately secured to prevent unauthorized access to that data.

Accordingly, it would be desirable to reduce user wait-times at an ATM and improve the transaction efficiency of an ATM without relying on third-party hardware or services. It would be further desirable to improve the transaction efficiency of an ATM without incurring the costs to procure and maintain third-party hardware or services. It would also be desirable to improve the transaction efficiency of an ATM without increasing the security risks associated with third-party hardware and services.

Accordingly, it is desirable to provide systems and methods for ATM color technology for mass transaction pre-staging.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Systems and methods for an ATM with color technology for mass transaction pre-staging are provided. The mass transaction pre-staging may include informing users of smart cards of the ability to transact with the ATM using smart card color technology.

The users of smart cards may be informed by red color changes for inability to transact. The users of smart cards may be informed by green color changes for ability to transact. The users of smart cards may be informed by yellow color changes for the ability to transact cautiously.

The ATM may include housing. The ATM may include a smart card interface. The smart card interface may be embedded in the ATM housing.

The smart card interface may establish a communication channel, via wireless fidelity ("Wi-Fi"), with a smart card. The smart card may be located a threshold distance from the ATM. The threshold distance may be, for example, 1-100 meters.

The smart card may include a microprocessor. The microprocessor may be in control of the smart card. The microprocessor may control the smart card and its components.

The smart card may include a camera. The camera may capture data for the smart card. The camera may capture data from the user of the smart card. The camera may visually identify the user of the smart card.

The smart card may include an ultra-nano light-emitting diode ("LED") display. The ultra-nano LED display may control the color of the smart card. The color of the smart card may change between its default color, red, yellow, and green. The smart card's default color may be, for example, grey, black, white, blue, or purple.

The smart card may include a battery. The battery may power the smart card. The battery may power the microprocessor, the camera, and the ultra-nano LED display.

The smart card may include executable instructions stored in a non-transitory memory. The executable instructions, when run by the microprocessor, may use the camera to identify, using facial recognition technology, a user of the smart card. The facial recognition technology may be based, at least in part, on proximity between the user of the smart card and the smart card. The proximity between the user of the smart card and the smart card may be, for example, 1-100 centimeters.

The location of the smart card may be determined based on the strength of a Wi-Fi signal. The strength of the Wi-Fi signal may be, for example, −90 to −30 decibel milliwatts ("dBm"). −30 dBm may correspond to a high Wi-Fi signal. −90 dBm may correspond to a low Wi-Fi signal.

The camera may capture data for the smart card. The data captured from the smart card may include, for example, an account balance of the smart card, an account status of the smart card, and a fraud history of the user of the smart card.

The smart card interface may extract the data from the smart card. The smart card interface may map the data to the location of the smart card. The smart card interface may process the data. The data may be processed for storage, transmission, and internal use.

The smart card interface may store the data in an artificial intelligence ("AI") based data storage. AI based data storage may make decisions regarding how to store and process the data.

The smart card interface may formulate a set of instructions for the smart card. The set of instructions may be based on the data. The set of instructions may include instructions to effect a change in the color of the ultra-nano LED display of the smart card.

The smart card interface may transmit, to the smart card, a data packet. The data packet may include the set of instructions. The set of instructions may include instructions to execute the data packet. The data packet, when executed by the smart card, may effect a change in the color of the ultra-nano LED display of the smart card.

The threshold distance of the smart card from the ATM may be, for example, 20 meters. The proximity between the user of the smart card and the smart card may be, for example, within 1 meter.

The smart card interface may establish a communication channel, via Wi-Fi, with each of a plurality of smart cards. Each of the plurality of smart cards may be located a threshold distance from the ATM. The threshold distance from the ATM of each of the plurality of smart cards may be, for example, 1-100 meters.

The camera of each of the plurality of smart cards may identify, using facial recognition technology, a user of each of the plurality of smart cards based at least in part on a proximity between the user of each of the plurality of smart cards and each of the plurality of smart cards. The location of each of the plurality of smart cards may be determined based on the strength of a Wi-Fi signal.

The camera of each of the plurality of smart cards may capture data for each of the plurality of smart cards. The data may include an account balance of each of the plurality of smart cards, an account status of each of the plurality of smart cards, and a fraud history of the user each of the plurality of smart cards.

The ATM may use the smart card interface to extract the data from each of the plurality of smart cards. The ATM may use the smart card interface to map the data to the location of each of the plurality of smart cards. The ATM may use the smart card interface to process the data for storage, transmission, and internal use. The ATM may use the smart card interface to store the data in an AI based data storage. The ATM may use the smart card interface to formulate a set of instructions for each of the plurality of smart cards.

Each set of instructions may be based on the data. Each set of instructions may include instructions to effect a change in the color of the ultra-nano LED display of each of the plurality of smart cards.

The smart card interface may transmit to each of the plurality of smart cards, a data packet. The data packet may include the set of instructions. The set of instructions may include instructions to execute the data packet. The data packet, when executed by the smart card, may effect a change in the color of the ultra-nano LED display of each of the plurality of smart cards.

The smart card interface may include a card color module. The card color module may modify the instructions to change the color displayed on the ultra-nano LED display of the smart card. The card color module may change the card color if necessary.

The set of instructions formulated by the microprocessor may be sufficient to execute a smart card transaction without the ATM prompting for additional data. The set of instructions formulated by the microprocessor may be sufficient to deny a smart card transaction without the ATM prompting for additional data.

The data packet, when executed by the smart card, may inform the user of the smart card about an estimated wait time on the ATM queue. The data packet, when executed by the smart card, may inform the user of the smart card about the total cash available to dispense from the ATM. The data packet, when executed by the smart card, may inform the user of the smart card about the total user capacity at the ATM.

The smart card interface may include an inactive state in which the smart card interface cannot extract the data from the smart card. The smart card interface may include an active state in which the smart card interface can extract the data from the smart card.

The ATM may toggle the smart card interface from the inactive state to the active state in response to the smart card interface establishing the communication channel with the smart card.

The inactive state may be a default state. When the smart card interface is in the inactive state, the data may not be extracted by the smart card interface.

A method for pre-staging a transaction between an ATM and a smart card is provided. The method may include using the ATM. The ATM may include housing. The ATM may include a smart card interface. The smart card interface may be embedded in the housing.

The method may include using the smart card interface. The method may include using the smart card interface to establish a communication channel, via Wi-Fi, with a smart card. The smart card may be located a threshold distance from the ATM.

The method may include using a smart card. The smart card may include a microprocessor, a camera, an ultra-nano LED display, a battery for powering the microprocessor, the camera, and the ultra-nano LED display, and executable instructions stored in a non-transitory memory. The executable instructions, when run by the microprocessor may use the camera to identify, using facial recognition technology, a user of the smart card based at least in part on a proximity between the user of the smart card and the smart card. The location of the smart card may be determined based on the strength of a Wi-Fi signal.

The method may include using the camera to capture data for the smart card. The data may include an account balance of the smart card, an account status of the smart card, and a fraud history of the user of the smart card.

The method may include using the smart card interface to extract the data from the smart card. The method may include using the smart card interface to map the data to the location of the smart card. The method may include using the smart card interface to process the data for storage, transmission, and internal use.

The method may include using the smart card interface to store the data in an AI based data storage. The method may include using the smart card interface to formulate a set of instructions for the smart card. The set of instructions may be based on the data. The set of instructions may include instructions to effect a change in the color of the ultra-nano LED display of the smart card.

The method may include using the smart card interface to transmit, to the smart card, a data packet. The data packet may include a set of instructions. The set of instructions may include instructions to execute the data packet. The data packet, when executed by the smart card, may effect a change in the color of the ultra-nano LED display of the smart card.

The method may include a threshold distance of the smart card from the ATM, including, for example, 20 meters. The method may include a proximity between the user of the smart card and the smart card including, for example, within 1 meter.

The method may include using the smart card interface to establish a communication channel, via Wi-Fi, with each of a plurality of smart cards. Each of the plurality of smart cards may be located a threshold distance from the ATM.

The method may include using the camera of each of the plurality of smart cards to identify, using facial recognition technology, a user of each of the plurality of smart cards based at least in part on a proximity between the user of each of the plurality of smart cards and each of the plurality of smart cards. The location of each of the plurality of smart cards being determined based on the strength of a Wi-Fi signal.

The method may include using each camera to capture data for each of the plurality of smart cards, the data comprising an account balance of each of the plurality of smart cards, an account status of each of the plurality of smart cards, and a fraud history of the user each of the plurality of smart cards.

The method may include using the smart card interface to extract the data from each of the plurality of smart cards. map the data to the location of each of the plurality of smart cards. The method may include using the smart card interface to process the data for storage, transmission, and internal use. The method may include using the smart card interface to store the data in an AI based data storage. The method may include using the smart card interface to formulate a set of instructions for each of the plurality of smart cards.

The method may include using each set of instructions based on the data. The method may include using each set of instructions including instructions to effect a change in the color of an ultra-nano LED display of each of the plurality of smart cards.

The method may include using the smart card interface to transmit to each of the plurality of smart cards a data packet including the set of instructions, the set of instructions including instructions to execute the data packet. The data packet, when executed by the smart card, may effect a change in the color of the ultra-nano LED display of each of the plurality of smart cards.

The method may include using a smart card interface including a card color module. The card color module may modify the instructions to change the color of the ultra-nano LED display of the smart card.

The method may include using a set of instructions formulated by the microprocessor. The set of instructions formulated by the microprocessor may be sufficient to execute a smart card transaction without the ATM prompting for additional data. The set of instructions formulated by the microprocessor may be sufficient to deny a smart card transaction without the ATM prompting for additional data.

The method may include using a data packet. The data packet, when executed by the smart card, may inform the user of the smart card about an estimated wait time, a total cash available to dispense, and a user capacity at the ATM.

A system including an ATM and a smart card is provided. The ATM may include housing. The ATM may include a smart card interface embedded in the housing.

The system may include a smart card interface that establishes a communication channel, via Wi-Fi, with a smart card. The smart card may be located a threshold distance from the ATM.

The system may include a smart card. The smart card may include a microprocessor. The smart card may include a camera. The smart card may include an LED display. The smart card may include a battery. The smart card may include executable instructions. The battery may be used for powering the microprocessor, the camera, and the ultra-nano LED display, and executable instructions stored in a non-transitory memory.

The executable instructions, when run by the microprocessor may use the camera to identify, using facial recognition technology, a user of the smart card based at least in part on a proximity between the user of the smart card and the smart card. The proximity and location of the smart card may be determined based on the strength of a Wi-Fi signal.

The system may use the camera to capture data for the smart card. The data captured may include an account balance of the smart card, an account status of the smart card, and a fraud history of the user of the smart card.

The system may include a smart card interface that extracts the data from the smart card. The system may include a smart card interface that maps the data to the location of the smart card. The system may include a smart card interface that processes the data for storage, transmission, and internal use. The system may include a smart card interface that stores the data in an AI based data storage.

The system may include a smart card interface that formulates a set of instructions for the smart card. The set of instructions may be based on the data. The set of instructions may include instructions to effect a change in the color of the ultra-nano LED display of the smart card.

The system may include a smart card interface that transmits, to the smart card, a data packet. The data packet may include a set of instructions. The set of instructions may include instructions to execute the data packet. The data packet, when executed by the smart card, may effect a change in the color of the ultra-nano LED display of the smart card.

The system may use the smart card interface to establish a communication channel, via Wi-Fi, with each of a plurality of smart cards. Each of the plurality of smart cards may be located a threshold distance from the ATM.

The system may use the camera of each of the plurality of smart cards to identify, using facial recognition technology, a user of each of the plurality of smart cards based at least in part on a proximity between the user of each of the plurality of smart cards and each of the plurality of smart cards. The system may determine the location of each of the plurality of smart cards based on the strength of a Wi-Fi signal.

The system may use the camera of each of the plurality of smart cards to capture data for each of the plurality of smart cards. The data captured may include an account balance of each of the plurality of smart cards, an account status of each of the plurality of smart cards, and a fraud history of the user each of the plurality of smart cards.

The system may use the smart card interface to extract the data from each of the plurality of smart cards. The system may use the smart card interface to map the data to the location of each of the plurality of smart cards. The system may use the smart card interface to process the data for storage, transmission, and internal use. The system may use the smart card interface to store the data in an AI based data storage. The system may use the smart card interface to formulate a set of instructions for each of the plurality of smart cards.

The set of instructions may be based on the data. The set of instructions may include instructions to effect a change in the color of an ultra-nano LED display of each of the plurality of smart cards.

The system may use the smart card interface to transmit to each of the plurality of smart cards, a data packet. The data packet may include a set of instructions. The set of instructions may include instructions to execute the data packet. The data packet, when executed by the smart card, may effect a change in the color of the ultra-nano LED display of each of the plurality of smart cards.

The system may use the smart card interface including a card color module. The card color module may modify the instructions to effect a change in the color of the ultra-nano LED display of each of the plurality of smart cards.

The system may use a set of instructions to effect a change in the color of the ultra-nano LED display of each of the plurality of smart cards. The system may use the set of instructions to change the color of the ultra-nano LED display of a smart card denied transacting with the ATM, to red. The system may use the set of instructions to change the color of the ultra-nano LED display of a smart card approved transacting with the ATM, to green. The system may use the set of instructions to change the color of the ultra-nano LED display of a smart card.

The smart card may include a microprocessor. The smart card may include various other components, such as a battery, a speaker, and display. The microprocessor may have a thickness that is not greater than 0.25 millimeters ("mm"). The microprocessor may control the overall operation of the smart card and its associated components. The smart card may include RAM, ROM, an input/output ("I/O") module and a non-transitory or non-volatile memory.

The I/O module may include a microphone which may accept user provided input. The I/O module may include one or more speakers for providing audio output and a display for providing textual, audiovisual and/or graphical output.

Software may be stored within the non-transitory memory and/or other storage media. The software may provide instructions to the microprocessor for enabling the smart card to perform various functions. For example, the non-transitory memory may store software used by the smart card, such as an operating system, application programs, web browser and a database. Alternatively, some or all of computer executable instructions of the smart card may be embodied in hardware or firmware components of the smart card.

Application programs, which may be used by the smart card, may include computer executable instructions for invoking user functionality related to communication, authentication services, and voice input and speech recognition applications. Application programs may utilize one or more algorithms that encrypt information, process received executable instructions, interact with an ATM, perform power management routines or other suitable tasks.

The ATM may detect high frequency wireless signals from a smart card. The smart card may be activated in response to receiving high frequency wireless signals. The high frequency signals may be detected by the smart card. The high frequency signals may be broadcast by an ATM. The high frequency signals may be generated by a near field communication ("NFC") reader. The high frequency signals may be generated by Wi-Fi reader. The high frequency signals may provide power to one or more components of the smart card. In response to receiving the power, the microprocessor may be activated and begin to draw power from a battery on the smart card.

The smart card may operate in a networked environment. The smart card may support establishing communication channels with one or more ATMs. The smart card may connect to a local area network ("LAN"), a wide area network ("WAN") or any suitable network. When used in a LAN networking environment, the smart card may be connected to the LAN through a network interface or adapter. The Smart card may include the network interface or adapter.

When used in a WAN networking environment, the smart card may include a modem or other means for establishing communications over a WAN, such as the Internet. The smart card may include the modem. It will be appreciated that the network connections shown are illustrative and other means of establishing a communications link between devices may be used. The existence of any of various well-known protocols such as TCP/IP, Ethernet, FTP, HTTP, and the like is presumed.

The smart card may be operational with numerous other general purpose or special purpose computing system environments or configurations. Examples of well-known computing systems, environments, and/or configurations that may be suitable for use with the disclosure include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc., that perform tasks or implement abstract data types. The smart card may be operational with distributed computing environments where tasks are performed by remote processing devices that are linked through a communications network. In a distributed computing environment, program modules may be in both local and remote computer storage media including memory storage devices.

The smart card may include one or more batteries. The battery of the smart card may be flexible. The battery may be a power source for electronic components of the smart card. For example, the battery may supply power to a camera, an ultra-nano LED display, and the microprocessor. The battery may have a thickness that is not greater than 0.5 mm.

The battery may be recharged via an electrical contact when the smart card is in contact with the ATM. The smart card's power source may include high frequency signals received from an ATM or other network node. The smart card may be configured to utilize received high frequency signals to recharge the battery or provide power to other components of the smart card.

The smart card may include a camera. The camera may include a circuitry for establishing communication with an ATM. The camera may be configured to implement protocols for wireless communication. The camera may include a wireless circuit.

The wireless circuit may include software and/or hardware for establishing a wireless communication channel with the ATM. Such protocol may include Wi-Fi, Bluetooth, Ethernet, NFC, and cellular telecommunications. Wi-Fi may include passive Wi-Fi with lower power consumption than typical Wi-Fi. The smart card may be configured to communicate using a typical Wi-Fi range such as 100-300 meters when searching for an available ATM wireless communication channel.

The camera of the smart card may include an NFC chip. The NFC chip may communicate over a typical NFC range (~10 centimeters) when transmitting or receiving sensitive data. An illustrative NFC chip may utilize a 13.56 MHz radio frequency. A microprocessor or the smart card may be configured to dynamically limit or expand transmitting and receiving ranges. The microprocessor may dynamically limit or expand transmitting and receiving ranges in response to detected location of the smart card.

For example, the microprocessor may expand a communication range when the smart card is within a "familiar" zone. Expanding the communication range may include using a Wi-Fi communication channel rather than an NFC communication channel. A familiar zone may be a pre-defined radius of a user's home or work location. The microprocessor may limit communication range when the smart card is within an "unknown" zone. For example, the microprocessor may limit a communication range when the user is travelling. The microprocessor may restrict the smart card to using NFC or contact-based communication channels when in an unknown zone.

The smart card may be activated in response to receiving wireless signals from the ATM. The wireless signals may provide power to one or more components of the smart card. Illustrative wireless signals may include NFC signals. Illustrative wireless signals may include Wi-Fi signals. For example, in response to receiving power via the wireless signals, a microprocessor of the smart card may be activated.

The smart card may include a battery for powering the camera, the ultra-nano LED display, and the microprocessor. The smart card may allow the user of the smart card to pre-stage a transaction at the ATM. Illustrative pre-staged transactions may include withdrawing cash, transferring funds between accounts, or depositing cash/checks.

The smart card may include a microprocessor. The microprocessor may be embedded in and protected by the smart card housing.

The smart card may include non-transitory memory locations within the smart card housing. The microprocessor may access such memory locations. The non-transitory memory may be included in the microprocessor.

The non-transitory memory locations may store instructions, that when executed by the microprocessor, cause the smart card to perform various functions. For example, the microprocessor may instruct the smart card to scan for wired or wireless communication channels and connect to a detected ATM.

The smart card may include a camera. The camera may be mounted outside of the smart card housing. The camera may be located inside the smart card housing. The camera may include Wi-Fi capabilities. The camera may not increase the form factor of the smart card defined by the ATM for receiving the smart card.

A user of the smart card may capture data using the camera. The data captured by the user may be sent by the camera. The data may be sent by the camera to the ATM. The data may be extracted by the ATM from the camera.

The user may capture data via the camera that would typically be requested by the ATM when authenticating the user. The user may capture data via the camera that would typically be requested by the ATM to initiate a transaction on behalf of the user.

The camera may identify, using facial recognition technology, a user of the smart card. The facial recognition technology may be based at least in part on a proximity between the user of the smart card and the smart card. The proximity between the user of the smart card and the smart card may be 1-100 centimeters. The camera may identify the location of the smart card determined based on the strength of a Wi-Fi signal. The strength of a Wi-Fi signal may be −90 to −30 dBm.

The camera may capture data for the smart card. The data may include an account balance of the smart card, an account status of the smart card, and a fraud history of the user of the smart card. The account balance of the smart card may indicate how much cash is available in the smart card account. The account status of the smart card may indicate whether the smart card is able to transact with the ATM. The fraud history of the user of the smart card may indicate present and past fraud associated with the user and the smart card.

The camera may allow the user to send data needed by the ATM before accessing the ATM. Capturing the data beforehand may enable the ATM to determine the status of the smart card user. The status of the smart card user may be sent back to the smart card user via a smart card display color change.

Sending the status of the smart card to the smart card user may reduce the amount of time the user spends waiting to access the ATM. Reducing the amount of time that a user spends waiting in an ATM queue may reduce the amount of time other users spend waiting for access to the ATM. Reducing the amount of time that a user spends waiting in an ATM queue may increase the number of transactions that the ATM may process per unit of time. Thus, reducing the amount of time the user spends waiting in an ATM queue may increase the transaction processing efficiency of the ATM.

Data captured using the camera may include authentication information that would typically be requested by an ATM before providing a user access to one or more services of the ATM. For example, the user may be captured by the camera by visual recognition or biometric feature. The authentication information may be encrypted and stored on the smart card. After capturing the authentication information, the smart card may send the authentication information to the ATM without requiring any further input from the user.

Data captured by the camera may include past transaction information that would typically be sent to the ATM only after physically inserting the smart card into the ATM. For example, the ATM may have all the data about the user and the smart card before reaching the ATM. The smart card may present to the user the ability to transact with the ATM without requiring any physical contact from the user. The smart card may interact with the ATM to execute color changes indicating account status without requiring any further input from the user.

Other illustrative data that may be captured by the camera may include a user's name, an expiration date of the smart card, a card verification value ("CVV"), or any other suitable data. Such information may be used to authenticate the user.

Data captured by the camera may be extracted by the ATM when the smart card is in electronic communication with the ATM. The data extracted by the ATM may be utilized by the ATM to pre-stage ATM transactions that would have otherwise required prompting for user inputs at the ATM. Capturing data on the smart card before the user accesses the ATM reduces the amount of time a user needs to spend waiting on an ATM queue, thereby increasing the transaction processing efficiency of the ATM.

The smart card may include executable instructions. The executable instructions may be stored in a non-transitory memory. The executable instructions, when run by the microprocessor, may implement various functions of the smart card. The executable instructions may enable data extraction from the camera.

The executable instructions may formulate a set of instructions executable by the ATM. The set of instructions executable by the ATM may be formulated based on the data (e.g., pre-transaction information) captured by the camera. For example, the microprocessor may formulate instructions for executing pre-transaction staging at the ATM. The microprocessor of the smart card may integrate the data captured from the camera into the set of transaction instructions that are executable by the ATM.

The smart card may transfer the set of instructions to the ATM. The smart card may transfer the set of instructions in response to establishing a communication channel with the ATM. The camera may be used to establish the communication channel. For example, the smart card may establish the communication channel when the smart card is located a threshold distance from the ATM. The threshold distance may be 1-100 meters. The ATM may autonomously initiate a pre-transaction staging based on the pre-transaction information or set of pre-transaction instructions stored on the smart card, thereby improving the transaction processing efficiency of the ATM.

The smart card may use the camera to capture identity and account status from a smart card user. The smart card may formulate instructions to pre-stage the smart card for a transaction with the ATM. The smart card may inform the smart card user of the smart card status before the smart card user inserts the smart card into the ATM.

The smart card may include a camera that includes a wireless camera. The smart card may scan for a wireless communication channel broadcast by the ATM. The smart card may attempt to establish a connection to the ATM using the detected wireless communication channel. The smart card may establish the wireless communication channel to the ATM before the smart card is inserted into the ATM.

The wireless communication channel may be used for transferring a set of pre-transaction instructions previously formulated by the smart card. In response to receiving the set of pre-transaction instructions, the ATM may pre-inform a smart card user of account status by initiating color changes at the user's smart card based on smart card account status.

Pre-informing users may include verifying any authentication information included in the set of pre-transaction instructions. The pre-informing may include verifying that the user has sufficient funds available to warrant dispensing cash to the user. The pre-informing may determine that further input is needed from the user before dispensing cash.

For example, a user's account or ATM location may be associated with a specific fraud-mitigating protocol. The fraud-mitigating protocol may require a user to provide additional authentication information or verify previously provided authentication information before the ATM executes a transaction stored on the smart card.

The ATM may pre-inform the smart card account status before the user approaches the ATM and inserts the smart card into the ATM. The user, in response to detecting that the smart card changed color may determine whether the user may transact with the ATM. For example, in response to detecting that the smart card changed color to green, the user may determine that the user's smart card may transact with the ATM. In response to detecting that the smart card changed color to red, the user may determine that the user's smart card may not transact with the ATM. And in response to detecting that the smart card changed color to yellow, the user may determine that the user's smart card may transact with the ATM with caution. Caution may include a low account balance, potential fraud on the account, or a risk for identity theft.

From the perspective of the user, the pre-staging for the transaction may be executed in real time before the smart card is inserted into the ATM. For example, the user may be informed whether the user's smart card may transact with the ATM before the user begins to wait on the ATM queue.

The camera of the smart card may have an inactive state. In the inactive state, the camera may not capture data entered using the camera. For example, in the inactive state, the microprocessor may not supply power to the camera. In the inactive state, the microprocessor and associated executable instructions may not capture data entered using the camera.

The camera may be in an active state. In the active state, the camera may be capable of capturing data entered by a user. In the active state, the microprocessor may supply power to the camera. In the active state, the microprocessor and associated executable instructions may capture and/or encrypt data entered by the user using the camera.

The inactive state of the camera may be a default state. When the camera is in the inactive state, data entered using the camera of the smart card is not captured by the microprocessor. The microprocessor may toggle the camera between the inactive and active states. For example, the microprocessor may activate the camera in response to establishing a communication channel with an ATM.

A system for increasing transaction processing efficiency of an ATM is provided. The system may include a smart card having a thickness not greater than 0.8 mm. The smart card may have a width not greater than 54 mm. The smart card may have a length not greater than 86 mm.

The system may include an ATM and a smart card. The smart card may include hardware and software for communicating with an ATM. For example, the smart card may include circuitry for communicating over Wi-Fi, NFC, Bluetooth, cellular or any suitable wireless network or protocol. The smart card may include a wired communication interface. For example, the smart card may include circuitry and externally accessible electrical contact(s) for communicating over a wired Ethernet or any suitable wired network or protocol.

The smart card may include a microprocessor. The microprocessor may be embedded in the smart card. The microprocessor may control communication conducting using the smart card. For example, the microprocessor may initiate communication with an ATM using the smart card. The microprocessor may terminate communication with the ATM by turning off the smart card. Turning off the smart card may include disconnecting from the ATM. Turning off the smart card may include terminating an ongoing communication session with the ATM. Turning off the smart card may include cutting off power supplied to the smart card. The smart card may be powered by an internal battery.

The system may include machine executable instructions. The executable instructions may be stored in a non-transitory memory on the smart card. In some embodiments, the executable instructions may be stored in a non-transitory memory on the ATM. The executable instructions may be transferred to the smart card using a communication channel established using the camera of the smart card.

The executable instructions, when run by the microprocessor, may self-authenticate a user or the smart card. Self-authentication may be conducted over a communication channel established using the camera. The communication channel may be a secure communication linking the smart card and the ATM.

The executable instructions, when run by the microprocessor on the smart card may formulate transaction instructions executable by the ATM. The transaction instructions may be transferred to the ATM over the securing communication channel linking the smart card and the ATM.

The transaction instructions may be formulated before a secure communication channel is established between the smart card and the ATM. For example, a user of the smart card may capture data using the camera when the user is at home. While at home, the smart card may not be within the communication range of an ATM.

An ATM may only establish a secure communication link with the smart card when the smart card is within a threshold distance of the ATM. When the smart card is within the threshold distance, the smart card may be likely or expected to access the ATM. The secure communication link may only be established when the smart card initiates a request to establish the secure communication link.

Transaction information or instructions stored locally on the smart card may be used to pre-stage a transaction at the ATM. A pre-staged transaction may include all data needed to inform a user of a smart card whether the smart card may execute a transaction at the ATM without requiring further input from a user. For example, before the ATM transaction, the pre-transaction instructions may include a user identity, the smart card account balance, and the smart card fraud history. When the ATM receives the pre-transaction instructions, the ATM may verify that the smart card is able to transact with the ATM. The ATM may also verify that the smart card account includes sufficient funds to fulfill a withdrawal request.

After conducting the verification, the ATM may execute the pre-transaction instructions. The ATM may send the pre-transaction instructions to the smart card. Thus, the user of the smart card may be informed of the smart card's ability to transact with the ATM before waiting on the ATM queue. The ATM may determine an order that users are standing in an ATM queue. The ATM may determine an optimum order to inform users waiting in an ATM queue of their abilities to transact with the ATM with ATM color technology.

The ATM may require authentication before establishing a wired connection with the smart card. For example, the ATM may require entry of user identity or submission of a visual identification before executing a pre-staged transaction.

Mass pre-staging of transactions may reduce the number of user inputs required at the ATM. Reducing the number of user inputs at the ATM improves the transaction processing efficiency of the ATM.

The smart card may include a wireless camera. The executable instructions stored in a non-transitory memory may scan for a wireless ATM communication channel. An ATM wireless communication channel may only be detectable when the smart card is within a threshold distance of an ATM. For example, the ATM wireless communication channel may be purposefully configured to have a maximum transmission range that is limited to a threshold distance from the ATM.

In response to detecting the wireless ATM communication channel, the smart card may transfer the data to the ATM over the wireless ATM communication channel. The ATM may pre-stage a transaction based on transaction instructions included in the received data. The ATM may execute the mass pre-staging of transactions only after establishing contact-based communication with the smart card.

Systems and methods are provided for mass pre-staging of ATM transactions using ATM color technology. The pre-staging may include pre-informing a user about an upcoming ATM transaction before the user inputs details on a smart card display. The pre-staging may include pre-informing a user regarding smart card account status before the user inserts the smart card inside an ATM.

The systems and methods may pre-inform a user regarding the quantity of users standing in an ATM queue at a threshold distance from the ATM. The systems and methods may pre-inform the user regarding the quantity of users eligible for ATM transactions.

The systems and methods may pre-inform the user regarding the user's account balance. The systems and methods may pre-inform the user regarding the quantity of users the ATM may transact with due to technical limitations.

The systems and methods may pre-inform the user regarding suspected fraud. The systems and methods may pre-inform the user regarding a low account balance.

The systems and methods may pre-inform the user standing in an ATM queue. The systems and methods may pre-inform the user to establish a higher level of user satisfaction in an ATM queue paradigm.

The systems and methods may provide a pre-staging of ATM transactions for a plurality of users. The systems and methods may pre-verify the status of each user going to transact with an ATM. The systems and methods may simultaneously pre-inform a plurality of users.

The systems and methods may provide a plurality of smart cards with ATM color technology for mass transaction pre-staging. The ATM color technology may enable the ATM to establish communication with debit, credit, and smart cards within a threshold proximity. The ATM color technology may interact with a user's smart card while the user is standing in an ATM queue.

The ATM color technology may change the user's smart card color to red, green, and yellow. Red color may indicate that the ATM is not able to transact with the user's smart card. For example, if the smart card color turns red, then it may mean that the ATM has declined communication with the smart card and transaction pre-staging may not proceed. Green color may indicate that the ATM is able to transact with the user's smart card. For example, green color may allow the ATM transaction. Yellow color may indicate a caution for transacting with the user's smart card, for example, low account balance. Yellow color may also indicate the ATM may transact up to a certain amount limit, for example $20-$200.

The ATM color technology may enable the ATM to integrate with smart cards associated with users standing in an ATM queue. The ATM color technology may enable the ATM to integrate with each user's financial institution. The ATM color technology may enable the ATM to fetch a user's account information. The ATM color technology may enable the ATM to identify a user's account balance. The ATM color technology may enable the ATM to identify any prior or current user or account fraud.

The ATM color technology may enable the ATM to identify a quantity of smart cards the ATM may integrate. For example, an ATM may have limitations based on resources available to it at any given time. In such a case, the ATM may change a limited quantity of smart cards to, for example, a green color. Such a change to green color may indicate that only those limited quantity of smart cards may interact with the ATM.

The ATM color technology may enable the ATM to send a user a justification or reason for changing the user's smart card to red or yellow. Thus, the user may take corrective action based on the justification or reason provided.

The ATM color technology may enable green cards to enter transactions with an ATM. The ATM color technology may enable the green cards to transact with a nearby ATM. The nearby ATM may be able to parallelly process a plurality of cards, thus enabling mass transaction pre-staging.

The nearby ATM may be located a threshold distance away from a plurality of users' smart cards. The threshold distance may be, for example, 100 feet, 200 feet, 300 feet, 400 feet, and 500 feet. The ATM may detect the plurality of users' smart cards within the threshold distance from the ATM. The ATM may be able to change the smart card colors to red, yellow, and green within the threshold distance from the ATM.

The ATM may use AI-based data storage. AI-based data storage may enable the ATM to use AI to sort and store data provided by a plurality of smart cards. The ATM may be self-sufficient thus not requiring information from financial institutions or other storage facilities.

The ATM may capture and extract data from a plurality of smart cards. The ATM may send the captured data to a remote server. The remote server may convert the captured data into data packets. The remote server may send the data packets to the plurality of smart cards. The ATM may encrypt the captured data to be sent externally to a remote server, a smart card, or to a plurality of smart cards.

Systems are provided for an ATM that may improve transaction processing efficiency of a plurality of smart cards. The ATM may include a smart card interface. The smart card interface may communicate wirelessly with the plurality of smart cards.

The ATM may include housing. The housing may contain electronic, structural, and functional components. The ATM may include a microprocessor. The microprocessor may be embedded in the housing. The microprocessor may control the ATM's processes. The ATM may include a battery. The battery may be used for powering the smart card interface and the microprocessor.

The ATM may include a camera. The camera may be mounted on an outside of the housing. The camera may communicate wirelessly with the plurality of smart cards. The camera may enter data regarding the plurality of smart cards into the ATM.

The ATM may include executable instructions. The executable instructions may be stored in a non-transitory memory. The executable instructions may be run by the microprocessor. The microprocessor may capture data entered using the camera. The microprocessor may formulate a set of transaction instructions executable by the plurality of smart cards. The set of transaction instructions executable by the plurality of smart cards may be based on the captured data.

The ATM may establish a communication channel with a plurality of smart cards. The ATM may establish a communication channel with the plurality of smart cards using the smart card interface. The ATM may, in response to establishing a communication channel with the plurality of smart cards using the smart card interface, initiate color changes at the plurality of smart cards. The color changes at the plurality of smart cards may be based on the set of transaction instructions. The color changes at the plurality of smart cards may improve the transaction processing efficiency of the plurality of smart cards.

The ATM may enter data using the camera. The data may include account balance, account status, and fraud history of the plurality of smart cards.

The ATM may include a smart card interface in wireless communication with a plurality of smart cards. The ATM may include a wireless communication circuit. The ATM may include executable instructions that, when executed by the microprocessor, initiate color changes at the plurality of smart cards. The color changes may be initiated in response to the ATM establishing a wireless communication channel with the plurality of smart cards.

The smart card interface may include a card color module. The card color module may include executable instructions. The executable instruction may, when executed by the microprocessor, initiate color changes at the plurality of smart cards. The color changes may be in response to the card color module interacting with the plurality of smart cards.

The ATM may include a set of transaction instructions formulated by the microprocessor. The set of transaction instructions may be sufficient to execute a transaction without the ATM prompting for additional data. The set of transaction instructions may be sufficient to deny a transaction without the ATM prompting for additional data.

The card color module may control the color changes at the plurality of smart cards using ultra-nano LED displays. The plurality of smart cards may include ultra-nano LED displays. The ultra nano LED displays may change color.

The camera may include an inactive state. In the inactive state, the camera may be unable to capture data. The camera may include an active state. In the active state, the camera may be capable of capturing data. The microprocessor may toggle the camera from the inactive state to the active state in response to establishing the communication channel with the plurality of smart cards. The inactive state may be a default state. When the camera is in the inactive state, data entered using the camera may not be captured by the microprocessor.

A system is provided for improving transaction processing efficiency of an ATM. The system may include an ATM. The ATM may include a smart card interface. The ATM may include a microprocessor.

The ATM may include a smart card interface. The smart card interface in the ATM architecture may be in electronic communication with a smart card microprocessor in a smart card architecture. The smart card interface may be in wireless communication with a plurality of smart cards.

Each smart card may include a camera. The camera may wirelessly interact with a smart card or a plurality of smart cards. The camera may obtain data from a smart card or a plurality of smart cards. The camera, via the microprocessor, may self-authenticate a smart card over a wireless communication channel.

The smart card interface may include a card fraud detector. The card fraud detector may detect fraud associated with the plurality of smart cards.

The smart card interface may include a card color interpreter. The card color interpreter may interpret the colors of the plurality of smart cards. The card color interpreter may determine a present color of a smart card or present colors of a plurality of smart cards.

The smart card interface may include an AI-based data storage. The AI-based data storage may use AI to store data obtained wirelessly using the camera.

The smart card may include executable instructions. The executable instructions may be stored in a non-transitory memory. The executable instructions may be run by the microprocessor.

The microprocessor may stage a plurality of transactions using color changes at the plurality of smart cards. The color changes at the plurality of smart cards may be based on the data. The color changes at the plurality of smart cards may improve the transaction processing efficiency of the plurality of smart cards.

The ATM may establish a secure communication link with a plurality of smart cards using the smart card interface.

The ATM may include a shift register. The shift register may be in electronic communication with the camera. The shift register may be in wireless communication with the plurality of smart cards.

Systems and methods in accordance with this disclosure will now be described in connection with the figures, which form a part hereof. The figures show illustrative features of system and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Systems may omit features shown and/or described in connection with illustrative systems. System embodiments may include features that are neither shown nor described in connection with illustrative system. Features of illustrative systems may be combined. For example, an illustrative system may include features shown or described in connection with another illustrative system/method.

As will be appreciated by one of skill in the art, the disclosure described herein may be embodied in whole or in part as a method, a data processing system, or a computer program product. Accordingly, the disclosure may take the form of entirely hardware, entirely software, or combining software, hardware and any other suitable approach or system.

Furthermore, such aspects may take the form of a computer program product stored by one or more computer-readable storage encoded media having computer-readable program code, or instructions, embodied in or on the storage encoded media. Any suitable computer readable storage encoded media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting encoded media such as metal wires, optical fibers, and/or wireless transmission encoded media (e.g., air and/or space).

Illustrative information that is exchanged with the system may be transmitted and displayed using any suitable markup language under any suitable protocol, such as those based on JAVA, COCOA, XML, or any other suitable languages or protocols.

Processes in accordance with the principles of the disclosure may include one or more features of the processes illustrated in FIGS. 1-5. For the sake of illustration, the steps of the processes illustrated in FIGS. 1-5 will be described as performed by a "system." The "system" may include one or more of the features of the systems that are shown or described herein and/or any other suitable device or approach. The "system" may be provided by an entity. The entity may be an individual, an organization or any other suitable entity.

Systems and methods described herein are illustrative. Systems and methods in accordance with this disclosure will now be described in connection with the figures, which form a part hereof. The figures show illustrative features of system and method steps in accordance with the principles of this disclosure. It is understood that other embodiments may be utilized, and that structural, functional, and procedural modifications may be made without departing from the scope and spirit of the present disclosure.

Figure 1:
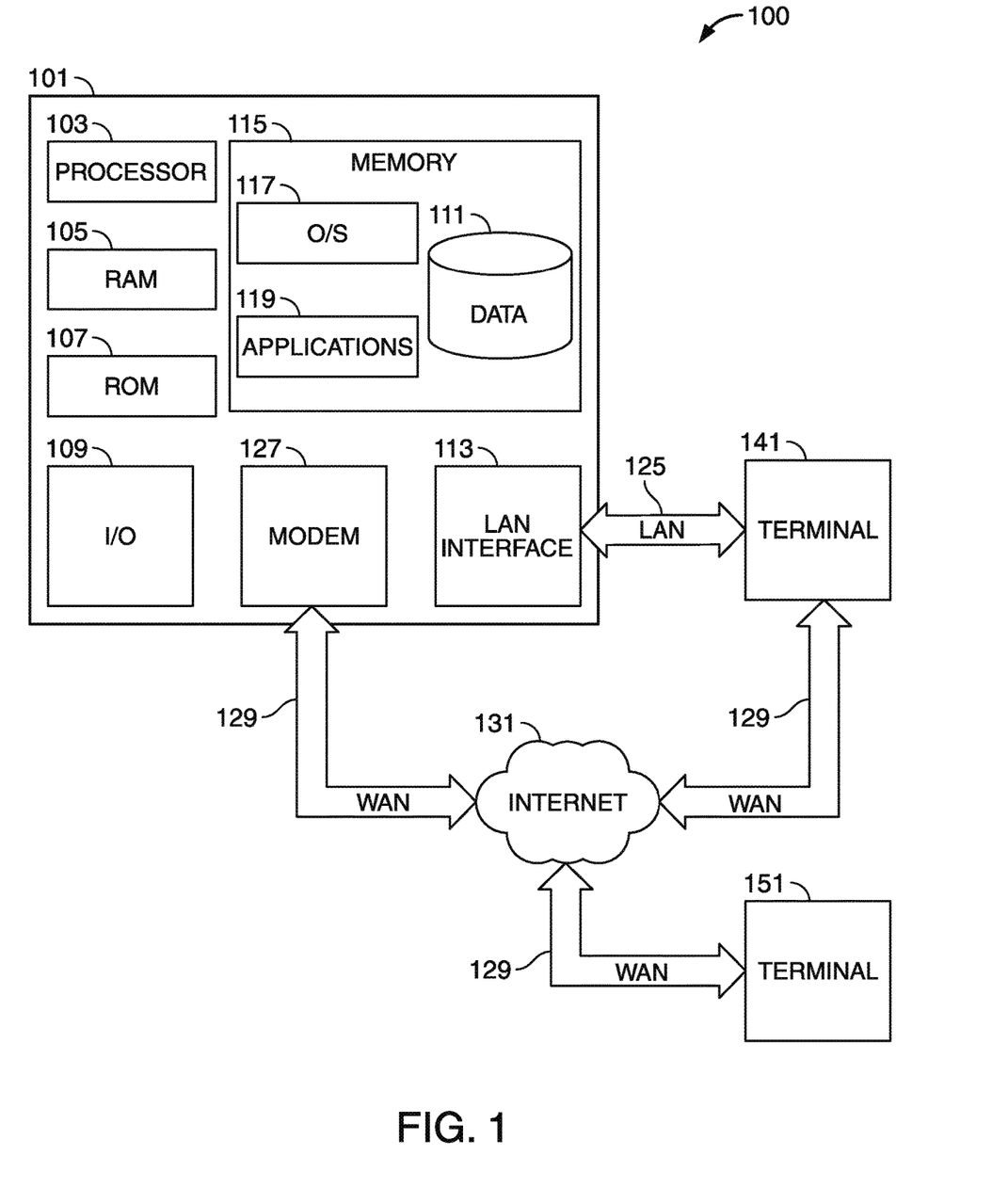
FIG. 1 shows an illustrative system in accordance with the principles of the disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, ATM, or any other suitable computing device. Elements of system 100, including computer 101, may be used to implement various aspects of the systems and methods disclosed herein.

One or more of the described systems, the ATM, the smart card, the smart card interface, etc., may comprise one or more computer systems and servers that include one or more of the following hardware components: Computer 101 may have a processor 103 for controlling the operation of the device and its associated components, and may include RAM 105, ROM 107, I/O module 109, and a non-transitory or non-volatile memory 115. Machine-readable memory may be configured to store information in machine-readable data structures. Processor 103 may also execute all software running on the computer. Other components commonly used for computers, such as EEPROM or Flash memory or any other suitable components, may also be part of the computer 101.

Memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory. Memory 115 may also store data such as executable instructions, smart card data, smart card account data, and smart card user data.

Alternatively, some or all executable instructions (alternatively referred to as "code") may be embodied in hardware or firmware (not shown). Computer 101 may execute the instructions embodied by the software to perform various functions.

I/O module may include connectivity to a microphone, keyboard, touch screen, mouse, and/or stylus through which a user of computer 101 may provide input. The input may include input relating to cursor movement. The input may relate to database backup, search, and recovery. The input/output module may also include one or more speakers for providing audio output and a video display device for providing textual, audio, audiovisual, and/or graphical output. The input and output may be related to computer application functionality. The input and output may be related to database backup, search, and recovery.

System 100 may be connected to other systems via a LAN interface 113. System 100 may operate in a networked environment supporting connections to one or more remote computers, such as terminals 141 and 151. Terminals 141 and 151 may be personal computers or servers that include many or all the elements described above relative to system 100.

The network connections depicted in FIG. 1 include a LAN 125 and a WAN 129 but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated if the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service ("SMS"), and voice input and speech recognition applications. Application program(s) 119 (which may be alternatively referred to herein as "plugins," "applications," or "apps") may include computer executable instructions for invoking user functionality related performing various tasks. The various tasks may be related to database backup, search, and recovery.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The disclosure may be operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc., that perform tasks or implement abstract data types. The disclosure may also be practiced in distributed computing environments where tasks are performed by remote processing devices that are linked through a communications network. In a distributed computing environment, program modules may be in both local and remote computer storage media including memory storage devices.

Figure 2:
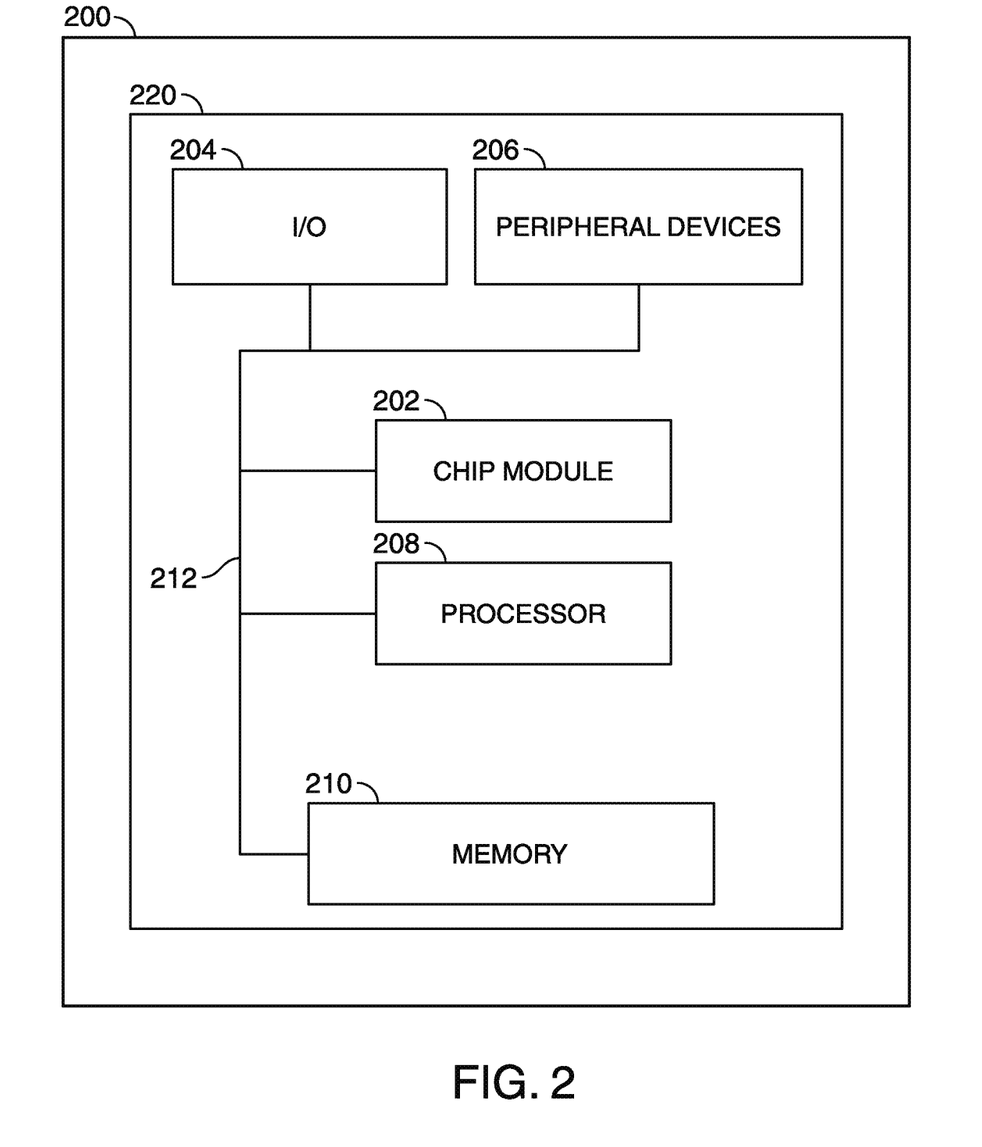
FIG. 2 shows illustrative information in accordance with the principles of the disclosure along with some of the system shown in FIG. 1.

FIG. 2 shows illustrative system 200 that may be configured in accordance with the principles of the disclosure. System 200 may be a computing machine. System 200 may include one or more features of the system shown in FIG. 1. System 200 may include chip module 202, which may include one or more integrated circuits, and which may include logic configured to perform any other suitable logical operations.

System 200 may include one or more of the following components: I/O circuitry 204, which may include a transmitter device and a computer device and may interface with fiber optic cable, coaxial cable, telephone lines, wireless devices, PHY layer hardware, a camera/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
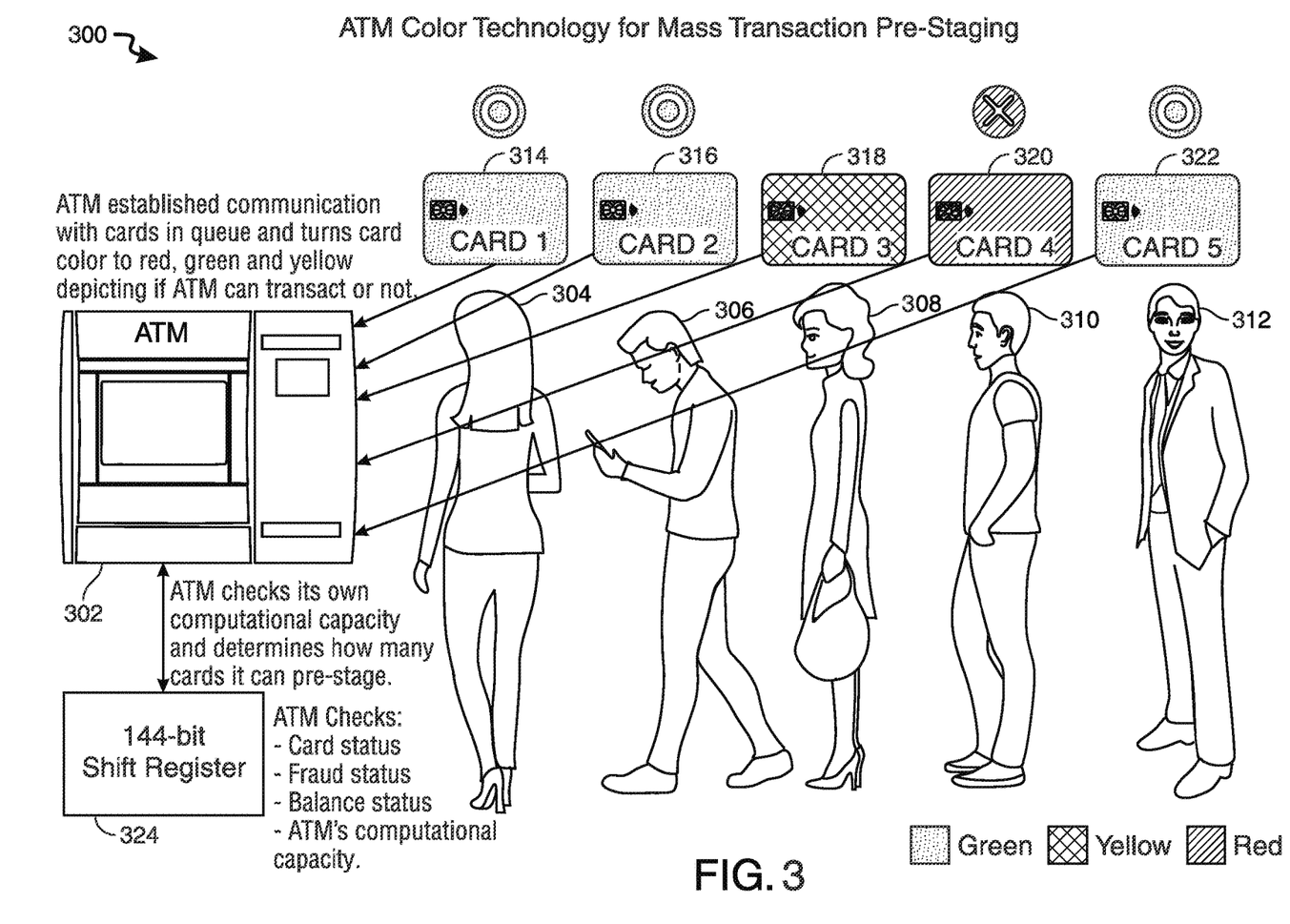
FIG. 3 shows an illustrative system and scenario in accordance with principles of the disclosure.

FIG. 3 shows illustrative scenario 300 for ATM color technology for mass transaction pre-staging. ATM 302 may establish communication with smart cards in an ATM queue via a wireless signal. The wireless signal may be an NFC. The wireless signal may be Wi-Fi. ATM 302 may change a smart card color to, for example, red, green, and yellow.

Red, green, and yellow smart card colors may depict whether the ATM may transact with the smart card. Red color may indicate the ATM may not transact with the smart card. For example, "Card 4" 320, held by user 310, may be colored red indicating that "Card 4" 320 may not transact with ATM 302. User 310 may be notified of "Card 4" 320 color change while waiting in a queue to transact with ATM 302. The red color on "Card 4" 320 may be further illustrated by an "X."

The green color may indicate the ATM may transact with that smart card. For example, "Card 1" 314, held by user 304, "Card 2" 316, held by user 306, and "Card 5" 322, held by user 312, may be colored green indicating that "Card 1" 314, "Card 2" 316, and "Card 5" 322 may transact with ATM 302. Users 304, 306, and 312 may be notified of the color change to "Card 1" 314, "Card 2" 316, and "Card 5" 322, respectively, while waiting in a queue to transact with ATM 302. The green color on Card 1, 314, Card 2, 316, and Card 5, 322, may be further illustrated by an "O."

The yellow color may indicate the ATM 302 is still inquiring whether it may transact with that smart card. A yellow smart card color may also indicate low account balance, suspected fraud, or a caution on the account. For example, "Card 3" 318, held by user 308, may be colored yellow indicating that "Card 3" 318 is still pending allowance to transact with ATM 302. User 308 may be notified of "Card 3" 318 color change while waiting in a queue to transact with ATM 302.

The ATM 302 may run computational analyses to determine information about itself and nearby smart cards. A 144-bit Shift Register 324, for example, may run computational analyses over ATM data and smart card data stored within the ATM. The ATM 302 may check its own computational capacity and determine how many smart cards it may pre-stage for transactions. The ATM 302 may check, for example, smart card status, fraud status, account balance status, and the ATM's computational capacity. The ATM's computational capacity may be the ATM's ability to handle a threshold number of smart cards at a time or for a certain amount of time.

Figure 4:
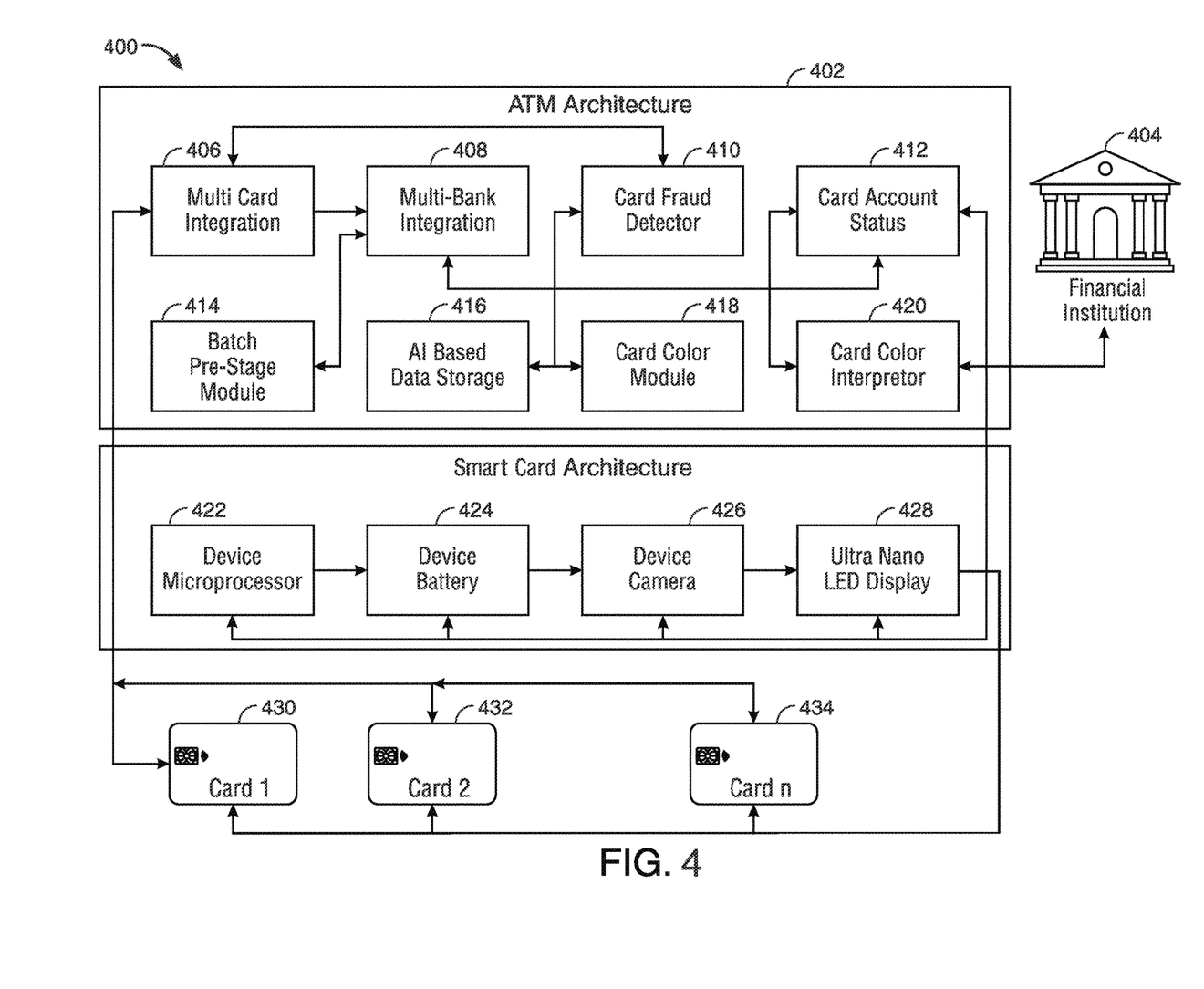
FIG. 4 shows an illustrative flow diagram in accordance with principles of the disclosure.

FIG. 4 shows illustrative flow diagram 400. An illustration of ATM architecture 402 is presented. ATM architecture 402 may be contained within an ATM. ATM architecture 402 may be an exemplary mechanism for ATM color technology for mass transaction pre-staging. Each pathway in the illustrative flow diagram may go either forward or backward, shown by arrows.

ATM architecture 402 may contain multi-card integration 406, multi-bank integration 408, card fraud detector 410, card account status 412, batch pre-stage module 414, AI based data storage 416, card color module 418, and card color interpreter 420.

"Card 1" 430, "Card 2" 432, and "Card n" 434 may interact with multi-card integration 406. Multi-card integration 406 may integrate the smart cards with the ATM. "Card n" 434 may represent an "n" number of smart cards that may be recognized by the multi-card integration 406. Multi-card integration 406 may detect and integrate an "n" number of smart cards with the ATM.

Multi-card integration 406 may interact with multi-bank integration 408. Multi-bank integration 408 may integrate the "n" number of smart cards with a plurality of financial institutions. Multi-bank integration 408 may also interact with batch pre-stage module 414 and smart card account status 812. Batch pre-stage module 414 may initiate transaction pre-staging for the batch of smart cards ("n" number of smart cards) and for the plurality of financial institutions involved. Card account status 412 may determine the account status for each smart card, for example, whether a smart card account is open, closed, overdrawn, low balance, or whether fraud is detected on a smart card, user, or account.

Multi-card integration 406 may also interact with card fraud detector 410. Card fraud detector 410 may determine whether a given smart card, for example, "Card 1" 430, "Card 2" 432, and/or "Card n" 434, has any associated prior and/or current fraud. Card fraud detector 410 may interact with artificial intelligence ("AI") based data storage 416 and card color module 418. AI based data storage 416 and card color module 418 may interact with each other. AI based data storage 416 may use AI to store data regarding smart card fraud detection and smart card coloring. Card color module 418 may control smart card color changes including red, yellow, and green.

Card account status 412 may also interact with card color interpreter 420, ultra nano LED display 428, device camera 426, device battery 424, and device microprocessor 422. Smart card architecture may provide an exemplary mechanism for ATM color technology for mass transaction pre-staging. Each pathway in the illustrative flow diagram may go either forward or backward, shown by arrows.

Smart card architecture may contain ultra nano LED display 428, device camera 426, device battery 424, and device microprocessor 422. Ultra nano LED display 428, device camera 426, device battery 424, and device microprocessor 422 may be a part of "Card 1" 430, "Card 2" 432, and "Card n" 434. Ultra nano LED display 428, device camera 426, device battery 424, and device microprocessor 422 may interact with "Card 1" 430, "Card 2" 432, and "Card n" 434.

Card color interpreter 420 may detect a smart card color and interpret the smart card color (e.g., default smart card color, red, yellow, or green). Ultra nano LED display 828 may control a nano LED display found on a smart card. Device camera 426 may provide a camera to visually ascertain a smart card color. Device battery 424 may control the battery for a smart card. Device microprocessor 422 may control the central processing for a smart card.

A financial institution 404 may interact with card color interpreter 420. The financial institution 404 may determine, based on information provided by card color interpreter 420, whether a given smart card (e.g., "Card 1" 430, "Card 2" 432, and "Card n" 434) may interact with the financial institution 404. Simultaneously, card color interpreter 420 may determine whether a given smart card may transact with the ATM.

Figure 5:
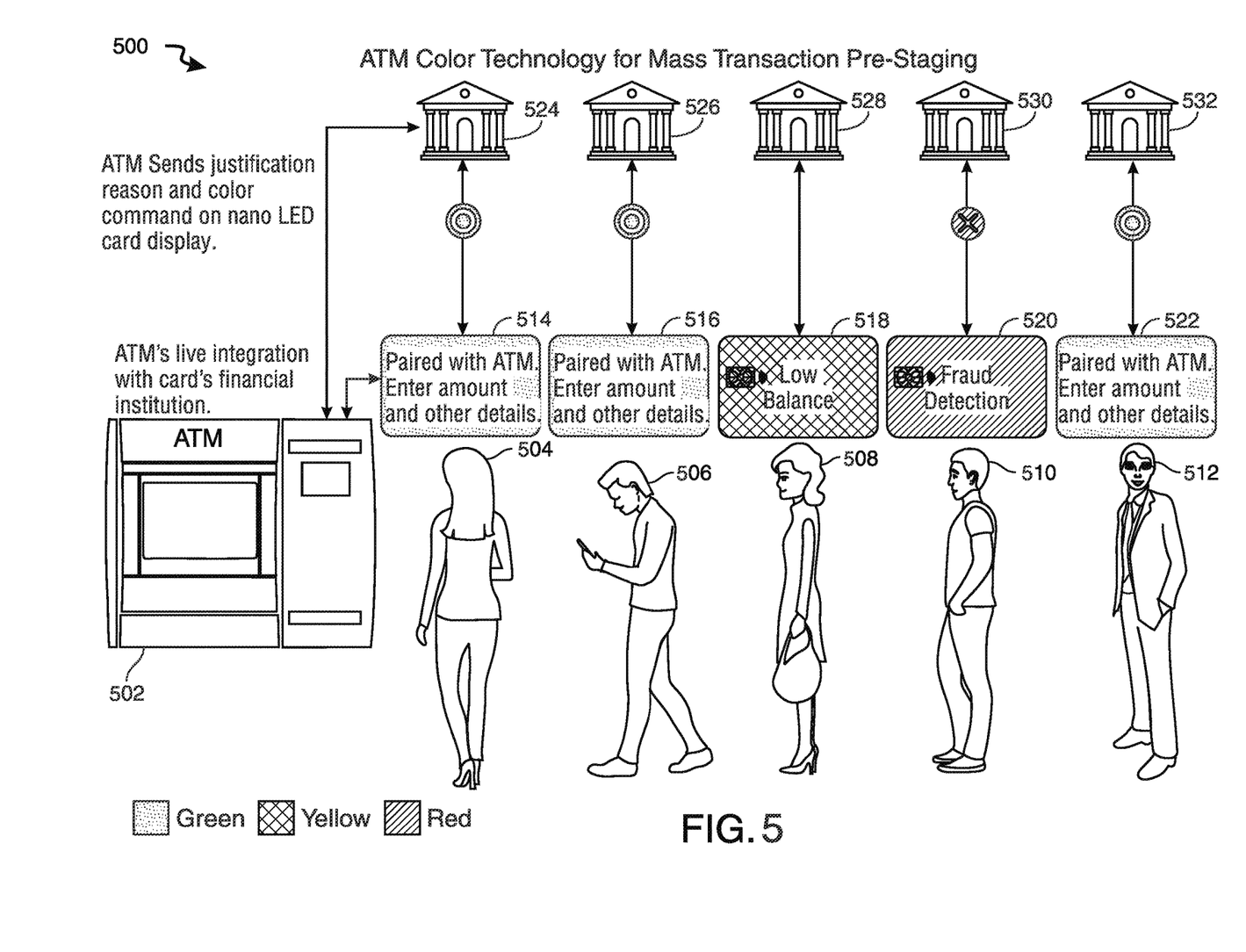
FIG. 5 shows an illustrative system and scenario in accordance with principles of the disclosure.

FIG. 5 shows illustrative scenario 500. Illustrative scenario 500 is another example for ATM color technology for mass transaction pre-staging. Each pathway in the illustrative scenario may go either forward or backward, shown by arrows.

ATM 502 may interact with financial institutions 524, 526, 528, 530, and 532. ATM 502 may also interact with smart cards 514, 516, 518, 520, and 522.

ATM 502 may engage in live integration with a smart card user's financial institution. ATM 502 may send a justification, a reason, and a smart card color command to a financial institution on a nano LED smart card display.

ATM 502 may pre-stage a mass number of smart cards, e.g., smart cards 514, 516, 518, 520, and 522, for transactions. The pre-staging may involve color changing smart cards. For example, smart cards 514, 516, and 522 may change green indicating an ability to transact with ATM 502. Smart cards 514, 516, and 522 may display to users 504, 506, and 512, respectively, "Paired with ATM. Enter amount and other details."

ATM 502 may also change the smart card color to yellow. A yellow color may indicate caution and the smart card display may prompt the smart card user for further information to allow a given smart card to transact with ATM 502. For example, smart card 518 may turn yellow and may display to user 508 "Low Balance." The smart card may only transact with ATM 502 when the card account balance is increased. Or the smart card may transact with ATM 502 albeit the yellow color or the "Low Balance" precaution.

Finally, ATM 502 may change the smart card color to red. A red color may indicate fraud on the smart card account or an inability for the smart card to transact with ATM 502. For example, smart card 520 may be changed to a red color and may display "Fraud Detection." User 510 may then be notified by the red color and the "Fraud Detection" display that there is fraud on the account. Further, the red color may indicate that smart card 520 may not interact with ATM 502.

One of ordinary skill in the art will appreciate that the elements shown and described herein may be performed in other than the recited order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for ATM color technology for mass transaction pre-staging are provided. Persons skilled in the art will appreciate that the present invention can be practiced by other than the described embodiments, which are presented for purposes of illustration rather than of limitation, and that the present invention is limited only by the claims that follow.

What is claimed is:

1. A system including an Automated Teller Machine ("ATM") with color technology for mass transaction pre-staging and a smart card, the system comprising:
    the ATM, the ATM including:
        a housing; and
        a smart card interface embedded in the housing, wherein the smart card interface:
            establishes a communication channel, via wireless fidelity ("Wi-Fi"), with a smart card, the smart card located a threshold distance from the ATM;
    the smart card, the smart card comprising:
        a microprocessor;
        a camera;
        an ultra-nano light-emitting diode ("LED") display;
        a battery for powering the microprocessor, the camera, and the ultra-nano LED display; and
        executable instructions stored in a non-transitory memory, that, when run by the microprocessor uses the camera to:
            use facial recognition technology to identify a user of the smart card, said identification of the user being based at least in part on a proximity between the user of the smart card and the smart card, wherein a location of the smart card is determined based on a strength of a Wi-Fi signal; and
            capture data for the smart card, the data comprising an account balance of the smart card, an account status of the smart card, and a fraud history of the user of the smart card; and
    wherein the smart card interface:
        extracts the data from the smart card;
        maps the data to the location of the smart card;
        processes the data for storage, transmission, and internal use;
        stores the data in an artificial intelligence ("AI") based data storage;
        formulates a set of instructions for the smart card, the set of instructions:
            being based on the data; and
            including instructions to effect a change in a color of the ultra-nano LED display of the smart card; and
        transmits, to the smart card, a data packet including the set of instructions, the set of instructions including instructions to execute the data packet; and
    wherein the data packet, when executed by the smart card, effects the change in the color of the ultra-nano LED display of the smart card.

2. The system of claim 1, wherein:
    the threshold distance of the smart card from the ATM is 20 meters; and
    the proximity between the user of the smart card and the smart card is within 1 meter.

3. The system of claim 1, wherein the ATM uses the smart card interface to:
    establish a communication channel, via Wi-Fi, with each of a plurality of smart cards, each of the plurality of smart cards located a threshold distance from the ATM;
    each of the plurality of smart cards comprising:
        a microprocessor;
        a camera;
        an ultra-nano LED display;
        a battery for powering the microprocessor, the camera, and the ultra-nano LED display; and
        executable instructions stored in a non-transitory memory, that, when run by the microprocessor:
            uses the camera to:
                use facial recognition technology to identify each of a plurality of users of the plurality of smart cards, said identification of each of the plurality of users being based at least in part on a proximity between each of the plurality of users and each of the plurality of smart cards, wherein a location of each of the plurality of smart cards is determined based on a strength of a Wi-Fi signal; and
                capture data for each of the plurality of smart cards, the data comprising an account balance of each of the plurality of smart cards, an account status of each of the plurality of smart cards, and a fraud history of each of the plurality of users of the plurality of smart cards; and
    wherein the ATM uses the smart card interface to:
        extract the data from each of the plurality of smart cards;
        map the data to the location of each of the plurality of smart cards;
        process the data for storage, transmission, and internal use;
        store the data in an AI based data storage;
        formulate a set of instructions for each of the plurality of smart cards, each of the set of instructions:
            being based on the data; and
            including instructions to effect a change in a color of the ultra-nano LED display of each of the plurality of smart cards; and
        transmit, to each of the plurality of smart cards, a data packet including the set of instructions, the set of instructions including instructions to execute the data packet; and
    wherein the data packet, when executed by the smart card, effects the change in the color of the ultra-nano LED display of each of the plurality of smart cards.

4. The system of claim 1, wherein the smart card interface comprises a card color module, the card color module modifying the instructions to change the color displayed on the ultra-nano LED display of the smart card.

5. The system of claim 1, wherein the set of instructions formulated by the microprocessor are sufficient to execute a smart card transaction without the ATM prompting for additional data.

6. The system of claim 1, wherein the set of instructions formulated by the microprocessor are sufficient to deny a smart card transaction without the ATM prompting for additional data.

7. The system of claim 1, wherein the data packet, when executed by the smart card, informs the user of the smart card about an estimated wait time, a total cash available to dispense, and a user capacity at the ATM.

8. The system of claim 1, wherein:
the smart card interface comprises:
an inactive state in which the smart card interface cannot extract the data from the smart card; and
an active state in which the smart card interface can extract the data from the smart card; and
the ATM toggles the smart card interface from the inactive state to the active state in response to the smart card interface establishing the communication channel with the smart card.

9. The system of claim 8, wherein:
the inactive state is a default state; and
when the smart card interface is in the inactive state, the data is not extracted by the smart card interface.

10. A method for pre-staging a transaction between an Automated Teller Machine ("ATM") and a smart card, the method comprising using the ATM comprising:
a housing; and
a smart card interface embedded in the housing;
wherein the smart card interface:
establishes a communication channel, via wireless fidelity ("WiFi"), with a smart card, the smart card located a threshold distance from the ATM;
the smart card comprising:
a microprocessor;
a camera;
an ultra-nano light-emitting diode ("LED") display;
a battery for powering the microprocessor, the camera, and the ultra-nano LED display; and
executable instructions stored in a non-transitory memory, that, when run by the microprocessor:
uses the camera to:
use facial recognition technology to identify a user of the smart card, said identification of the user being based at least in part on a proximity between the user of the smart card and the smart card, wherein a location of the smart card is determined based on a strength of a Wi-Fi signal; and
capture data for the smart card, the data comprising an account balance of the smart card, an account status of the smart card, and a fraud history of the user of the smart card; and
wherein the smart card interface:
extracts the data from the smart card;
maps the data to the location of the smart card;
processes the data for storage, transmission, and internal use;
stores the data in an artificial intelligence ("AI") based data storage;
formulates a set of instructions for the smart card, the set of instructions:
being based on the data; and
including instructions to effect a change in a color of the ultra-nano LED display of the smart card; and
transmits, to the smart card, a data packet including the set of instructions, the set of instructions including instructions to execute the data packet; and
wherein the data packet, when executed by the smart card, effects the change in the color of the ultra-nano LED display of the smart card.

11. The method of claim 10 wherein:
the threshold distance of the smart card from the ATM is 20 meters; and
the proximity between the user of the smart card and the smart card is within 1 meter.

12. The method of claim 10 wherein, using the smart card interface:
establish a communication channel, via Wi-Fi, with each of a plurality of smart cards, each of the plurality of smart cards located a threshold distance from the ATM;
each of the plurality of smart cards comprising:
a microprocessor;
a camera;
an ultra-nano LED display;
a battery for powering the microprocessor, the camera, and the ultra-nano LED display; and
executable instructions stored in a non-transitory memory, that, when run by the microprocessor:
use the camera to:
use facial recognition technology to identify each of a plurality of users of the plurality of smart cards, said identification of each of the plurality of users being based at least in part on a proximity between each of the plurality of users and each of the plurality of smart cards, wherein a location of each of the plurality of smart cards is determined based on a strength of a Wi-Fi signal; and
capture data for each of the plurality of smart cards, the data comprising an account balance of each of the plurality of smart cards, an account status of each of the plurality of smart cards, and a fraud history of each of the plurality of users of the plurality of smart cards; and
wherein the ATM uses the smart card interface to:
extract the data from each of the plurality of smart cards;
map the data to the location of each of the plurality of smart cards;
process the data for storage, transmission, and internal use;
store the data in an AI based data storage;
formulate a set of instructions for each of the plurality of smart cards, each of the set of instructions:
being based on the data; and
including instructions to effect a change in a color of the ultra-nano LED display of each of the plurality of smart cards; and
transmit, to each of the plurality of smart cards, a data packet including the set of instructions, the set of instructions including instructions to execute the data packet; and
wherein the data packet, when executed by the smart card, effects the change in the color of the ultra-nano LED display of each of the plurality of smart cards.

13. The method of claim 10, wherein the smart card interface comprises a card color module, the card color module modifying the instructions to change the color of the ultra-nano LED display of the smart card.

14. The method of claim 10, wherein the set of instructions formulated by the microprocessor are sufficient to execute a smart card transaction without the ATM prompting for additional data.

15. The method of claim 10, wherein the set of instructions formulated by the microprocessor are sufficient to deny a smart card transaction without the ATM prompting for additional data.

16. The method of claim 10, wherein the data packet, when executed by the smart card, informs the user of the smart card about an estimated wait time, a total cash available to dispense, and a user capacity at the ATM.

17. A system with color technology for mass transaction pre-staging, the system comprising an Automated Teller Machine ("ATM") and a smart card, the ATM comprising:
a housing; and
a smart card interface embedded in the housing, wherein the smart card interface:
established a communication channel, via wireless fidelity ("Wi-Fi"), with a smart card, the smart card located a threshold distance from the ATM;
the smart card comprising:
a microprocessor;
a camera;
an ultra-nano light-emitting diode ("LED") display;
a battery for powering the microprocessor, the camera, and the ultra-nano LED display; and
executable instructions stored in a non-transitory memory, that, when run by the microprocessor:
uses the camera to:
capture data for the smart card, the data comprising an account balance of the smart card, an account status of the smart card, and a fraud history of a user of the smart card; and
wherein the smart card interface:
extracts the data from the smart card;
maps the data to the location of the smart card;
processes the data for storage, transmission, and internal use;
stores the data in an artificial intelligence ("AI") based data storage;
formulates a set of instructions for the smart card, the set of instructions:
being based on the data; and
including instructions to effect a change in a color of the ultra-nano LED display of the smart card; and
transmits, to the smart card, a data packet including the set of instructions, the set of instructions including instructions to execute the data packet; and
wherein the data packet, when executed by the smart card, effects the change in the color of the ultra-nano LED display of the smart card.

18. The system of claim 17, wherein the smart card interface:
establishes a communication channel, via Wi-Fi, with each of a plurality of smart cards, each of the plurality of smart cards located a threshold distance from the ATM;
each of the plurality of smart cards comprising:
a microprocessor;
a camera;
an ultra-nano LED display;
a battery for powering the microprocessor, the camera, and the ultra-nano LED display; and
executable instructions stored in a non-transitory memory, that, when run by the microprocessor:
use the camera to:
use facial recognition technology to identify each of a plurality of users of the plurality of smart cards, said identification of each of the plurality of users being based at least in part on a proximity between each of the plurality of users and each of the plurality of smart cards, wherein a location of each of the plurality of smart cards is determined based on a strength of a Wi-Fi signal; and
capture data for each of the plurality of smart cards, the data comprising an account balance of each of the plurality of smart cards, an account status of each of the plurality of smart cards, and a fraud history of each of the plurality of users of the plurality of smart cards; and
wherein the ATM uses the smart card interface to:
extract the data from each of the plurality of smart cards;
map the data to the location of each of the plurality of smart cards;
process the data for storage, transmission, and internal use;
store the data in an AI based data storage;
formulate a set of instructions for each of the plurality of smart cards, each of the set of instructions:
being based on the data; and
including instructions to effect a change in a color of the ultra-nano LED display of each of the plurality of smart cards; and
transmit, to each of the plurality of smart cards, a data packet including the set of instructions, the set of instructions including instructions to execute the data packet; and
wherein the data packet, when executed by the smart card, effects the change in the color of the ultra-nano LED display of each of the plurality of smart cards.

19. The system of claim 18, wherein the smart card interface comprises a card color module, the card color module modifying the instructions to effect a change in the color of the ultra-nano LED display of each of the plurality of smart cards.

20. The system of claim 19, wherein the instructions to effect a change in the color of the ultra-nano LED display of each of the plurality of smart cards comprise instructions to change the color of the ultra-nano LED display of a smart card denied transacting with the ATM, to red, to change the color of the ultra-nano LED display of a smart card approved transacting with the ATM, to green, and to change the color of the ultra-nano LED display of a smart card cautioned transacting with the ATM, to yellow.

* * * * *